(12) United States Patent
Kancharla et al.

(10) Patent No.: US 11,588,685 B2
(45) Date of Patent: *Feb. 21, 2023

(54) CLOUD INFRASTRUCTURE FOR ISOLATION AND RUN-TIME BEHAVIORAL TUNING THROUGH CONFIGURATION EXTERNALIZATION

(71) Applicant: Capital One Services, LLC, McLean, VA (US)

(72) Inventors: Gopi Kancharla, Frisco, TX (US); Anurag Andoji, Frisco, TX (US); Praveen K. Tandra, Allen, TX (US); Raman Bajaj, Frisco, TX (US); Parvesh Kumar, Plano, TX (US); Sanjiv Yajnik, Dallas, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/395,935

(22) Filed: Aug. 6, 2021

(65) Prior Publication Data

US 2021/0377110 A1 Dec. 2, 2021

Related U.S. Application Data

(63) Continuation of application No. 16/821,739, filed on Mar. 17, 2020, now Pat. No. 11,128,529.

(51) Int. Cl.
*H04L 41/0806* (2022.01)
*H04L 9/40* (2022.01)
(Continued)

(52) U.S. Cl.
CPC ........ *H04L 41/0806* (2013.01); *G06F 9/5072* (2013.01); *H04L 43/065* (2013.01);
(Continued)

(58) Field of Classification Search
CPC ... H04L 41/0806; H04L 43/065; H04L 43/16; H04L 63/0263; H04L 63/1425;
(Continued)

(56) References Cited

U.S. PATENT DOCUMENTS

| 8,539,589 B2 | 9/2013 | Prafullchandra et al. |
| 9,754,038 B2 | 9/2017 | Collins et al. |

(Continued)

OTHER PUBLICATIONS

U.S. Appl. No. 16/821,739, "Cloud Infrastructure for Isolation and Run-Time Behavioral Tuning Through Configuration Externalization", to Gopi Kancharla, filed Mar. 17, 2020, pp. 1-56.

*Primary Examiner* — Michael Won
(74) *Attorney, Agent, or Firm* — Sterne, Kessler, Goldstein & Fox P.L.L.C.

(57) ABSTRACT

Embodiments generally relate to a cloud computing infrastructure and method of operating the same including at least: receiving a configuration file from a configuration repository; receiving a request from a first device to configure an application rule set of one or more nodes based on the configuration file; transmitting the request to a receiver node selected from the one or more nodes; generating a notification alerting the one or more nodes that the request is stored on a database; distributing the configuration file to a subset of the one or more nodes based on receipt of an access request from the one or more nodes; and updating the application rule set of the subset of the one or more nodes based on the configuration file.

20 Claims, 4 Drawing Sheets

(51) Int. Cl.
  *H04L 67/10* (2022.01)
  *G06F 9/50* (2006.01)
  *H04L 43/065* (2022.01)
  *H04L 43/16* (2022.01)

(52) U.S. Cl.
  CPC .......... *H04L 43/16* (2013.01); *H04L 63/0263* (2013.01); *H04L 63/1425* (2013.01); *H04L 67/10* (2013.01)

(58) Field of Classification Search
  CPC . H04L 67/10; H04L 41/0894; H04L 41/0686; H04L 41/082; H04L 41/0859; H04L 67/34; H04L 41/0843; G06F 9/5072
  See application file for complete search history.

(56) References Cited

U.S. PATENT DOCUMENTS

| | | |
|---|---|---|
| 9,898,344 B2 | 2/2018 | Kalali |
| 10,187,353 B2 | 1/2019 | Muppala et al. |
| 10,325,003 B2 | 6/2019 | Dighe et al. |
| 10,430,204 B2 | 10/2019 | Reeves et al. |
| 10,831,789 B2 | 11/2020 | Srinivasan et al. |
| 2002/0112038 A1 | 8/2002 | Hessmer et al. |
| 2006/0143144 A1 | 6/2006 | Speeter et al. |
| 2012/0096365 A1 | 4/2012 | Wilkinson et al. |
| 2013/0144590 A1 | 6/2013 | Salle et al. |
| 2016/0359872 A1 | 12/2016 | Yadav et al. |
| 2017/0132568 A1* | 5/2017 | Glunz .................... H04L 67/10 |
| 2017/0302553 A1 | 10/2017 | Zafer et al. |
| 2018/0287898 A1 | 10/2018 | Bellini, III et al. |
| 2018/0316556 A1 | 11/2018 | Quinn |
| 2020/0296173 A1 | 9/2020 | Feiguine et al. |

\* cited by examiner

CLOUD INFRASTRUCTURE FOR ISOLATION AND RUN-TIME BEHAVIORAL TUNING THROUGH CONFIGURATION EXTERNALIZATION

CROSS-REFERENCE TO RELATED APPLICATIONS

This application is a continuation of U.S. patent application Ser. No. 16/821,739, filed on Mar. 17, 2020, the contents of which is incorporated by reference herein.

TECHNICAL FIELD

An embodiment of the present disclosure relates generally to a cloud computing infrastructure, and more particularly to a cloud computing infrastructure for isolation and run-time behavioral tuning through configuration externalization.

BACKGROUND

Rule Management Systems (RMS) have become widely used to implement various computing functions including implementing rules, policies, and guidelines for operation of computing devices. One problem when using RMS systems in cloud computing environments is the inability to update various computing devices implementing the rules, policies, and guidelines of the RMS without impacting the other devices. Despite technological advancements, current technologies still lack the ability to adequately update computing devices in cloud-based RMS systems. Accordingly, there remains a need for improved techniques for updating computing devices in cloud-based RMS systems.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the pertinent art to make and use the disclosure.

DETAILED DESCRIPTION

Embodiments of the disclosure provide a system for updating and configuring an application rule set in a cloud computing environment, independently from a software download process for one or more nodes. This separation provides the system the ability to isolate the rules, policies, and guidelines that the nodes are to implement from the underlying functions that provide the operational functionality of the nodes. As a result, the software which makes the nodes operate is separated from the rules, policies, and guidelines implemented by the nodes implementing the RMS.

The following embodiments are described in sufficient detail to enable those skilled in the art to make and use the disclosure. It is to be understood that other embodiments would be evident based on the present disclosure, and that system, process, or mechanical changes may be made without departing from the scope of an embodiment of the present disclosure.

In the following description, numerous specific details are given to provide a thorough understanding of embodiments. However, it will be apparent that embodiments may be practiced without these specific details. In order to avoid obscuring an embodiment, some well-known circuits, system configurations, and process steps are not disclosed in detail.

The drawings showing embodiments of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the system can be operated in any orientation.

Certain embodiments have other steps or elements in addition to or in place of those mentioned. The steps or elements will become apparent to those skilled in the art from a reading of the following detailed description when taken with reference to the accompanying drawings.

The term "module" or "unit" referred to herein can include software, hardware, or a combination thereof in an embodiment of the present disclosure in accordance with the context in which the term is used. For example, the software can be machine code, firmware, embedded code, or application software. Also for example, the hardware can be circuitry, a processor, a special purpose computer, an integrated circuit, integrated circuit cores, a pressure sensor, an inertial sensor, a microelectromechanical system (MEMS), passive devices, or a combination thereof. Further, if a module or unit is written in the system or apparatus claims section below, the module or unit is deemed to include hardware circuitry for the purposes and the scope of the system or apparatus claims.

The term "service" or "services" referred to herein can include a collection of modules or units. A collection of modules or units can be arranged, for example, in software or hardware libraries or development kits in an embodiment of the present disclosure in accordance with the context in which the term is used. For example, the software or hardware libraries and development kits can be a suite of data and programming code, for example pre-written code, classes, routines, procedures, scripts, configuration data, or a combination thereof, that can be called directly or through an application programming interface (API) to facilitate the execution of the functions disclosed.

The modules, units, and services in the following description of the embodiments can be coupled to one another as described or as shown. The coupling can be direct or indirect, without or with intervening items between coupled modules, units, or services. The coupling can be by physical contact or by communication between modules, units, or services.

Figure 1:
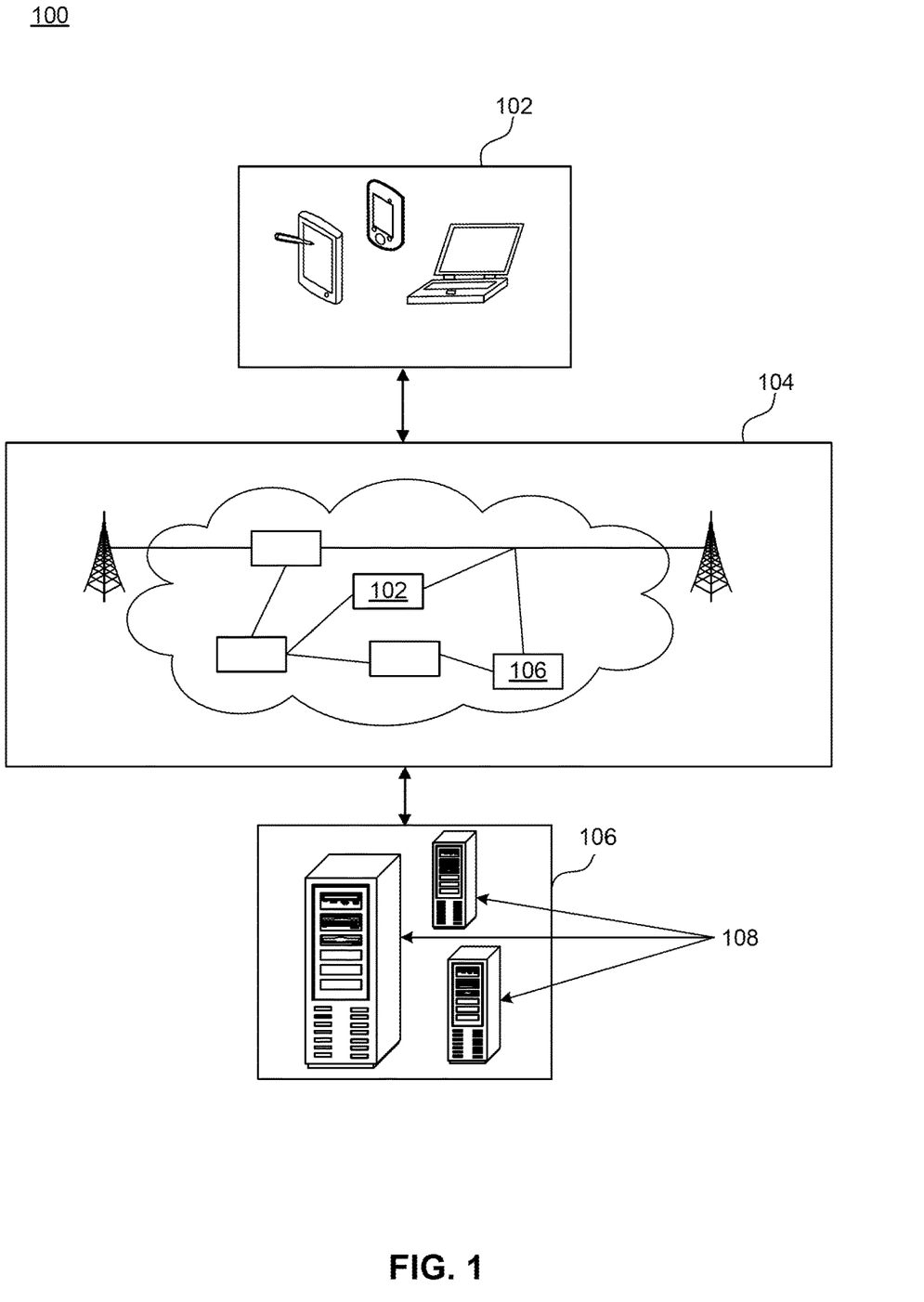
FIG. 1 is an example cloud computing system for isolation and run-time behavioral tuning through configuration externalization according to embodiments.

Referring now to FIG. 1, therein is shown an example cloud computing system 100 (or "system 100") for isolation and run-time behavioral tuning through configuration externalization according to embodiments. The system 100 is a cloud computing platform designed to manage communications between one or more computing devices that operate within the system 100. The system 100 provides a platform that facilitates communication regarding, notification of, distribution of, and implementation of messages, configurations, and updates between the devices or a subset of the devices. Further details regarding the communication, notification, distribution, and implementation of messages, configurations, and updates will be discussed further below.

In one embodiment, the system 100 can include a first device 102, such as a client device or a server, connected to a second device 106, such as a client device or server. In one embodiment, the first device 102 and the second device 106 can be standalone devices or a distribution of devices, such as a distribution of client devices or servers. If implemented as a distribution of devices, the distribution can include one or more further client devices or servers. Such further client devices or servers can be implemented as one or more nodes 108 of the first device 102 or the second device 106. For example, if the second device 106 is implemented as a distribution of devices, in one embodiment, the second device 106 can include one or more servers which can be the nodes 108. In one embodiment, the nodes 108 can, instead of being one or more client devices or servers, can be one or more services running on the first device 102 or the second device 106, such that each of the nodes 108 can be software running within the first device 102 or the second device 106 to perform a particular function for the first device 102 or the second device 106.

In one embodiment, the first device 102 and the second device 106 can communicate with each other through a communication path 104, such as a wireless or wired network. For example, the first device 102 can be of any of a variety of devices, such as a smart phone, a cellular phone, a personal digital assistant, a tablet computer, a notebook computer, a laptop computer, a desktop computer, or a combination thereof. The first device 102 can couple, either directly or indirectly, to the communication path 104 to communicate with the second device 106 or can be a stand-alone device.

The second device 106 can be any of a variety of centralized or decentralized computing devices. For example, the second device 106 can be a laptop computer, a desktop computer, grid-computing resources, a virtualized computing resource, cloud computing resources, routers, switches, peer-to-peer distributed computing devices, a server, a server farm, or a combination thereof. The second device 106 can be centralized in a single room, distributed across different rooms, distributed across different geographical locations, or can be embedded within a telecommunications network. The second device 106 can couple with the communication path 104 to communicate with the first device 102 or can be a stand-alone device.

For illustrative purposes, the system 100 is shown with the first device 102 as a client device, although it is understood that the system 100 can have the first device 102 as a different type of device. For example, the first device 102 can be a server. Also for illustrative purposes, the system 100 is shown with the second device 106 as a server, although it is understood that the system 100 can have the second device 106 as a different type of device. For example, the second device 106 can be a client device.

For brevity of description in the embodiments discussed below, the first device 102 will be described as a client device and the second device 106 will be described as a server device. The embodiments disclosed herein, however, are not limited to this selection for the type of devices. The selection is an example of an embodiment.

Also for illustrative purposes, the system 100 is shown with the first device 102 and the second device 106 as end points of the communication path 104, although it is understood that the system 100 can have a different partition between the first device 102, the second device 106, and the communication path 104. For example, the first device 102 and the second device 106 can also function as part of the communication path 104.

The communication path 104 can span and represent a variety of networks and network topologies. For example, the communication path 104 can include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Cable, Ethernet, digital subscriber line (DSL), fiber optic lines, fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
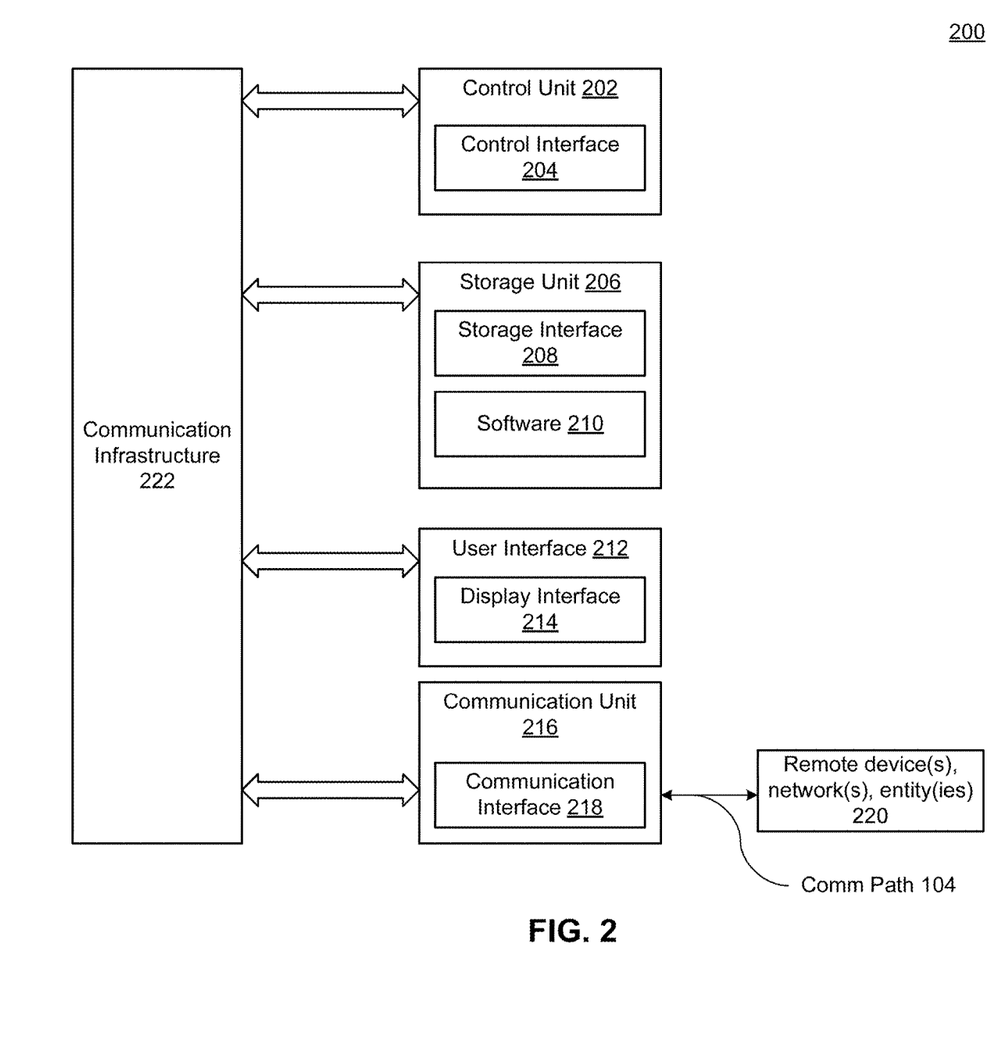
FIG. 2 is an example block diagram of the components of the system according to embodiments.

Referring now to FIG. 2, therein is shown an example block diagram of the components 200 of the system 100 according to embodiments. The components 200 shown can be used or implemented in any of the devices of the system 100. For example, the components 200 can be used or implemented in the first device 102, the second device 106, the nodes 108, or a combination thereof.

In one embodiment, the components 200 can include a control unit 202, a storage unit 206, a communication unit 216, and a user interface 212. The control unit 202 can include a control interface 204. The control unit 202 can execute a software 210 to provide some or all of the intelligence of the system 100. The control unit 202 can be implemented in a number of different ways. For example, the control unit 202 can be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 204 can be used for communication between the control unit 202 and other functional units or devices of the system 100. The control interface 204 can also be used for communication that is external to the functional units or devices of the system 100. The control interface 204 can receive information from the functional units or devices of the system 100, or from remote devices 220, or can transmit information to the functional units or devices of the system 100 or to remote devices 220. The remote devices 220 refer to functional units or devices external to the system 100.

The control interface 204 can be implemented in different ways and can include different implementations depending on which functional units or devices of the system 100 or remote devices 220 are being interfaced with the control unit 202. For example, the control interface 204 can be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 204 can be connected to a communication infrastructure 222, such as a bus, to interface with the functional units or devices of the system or remote devices 220.

The storage unit 206 can store the software 210. For illustrative purposes, the storage unit 206 is shown as a single element, although it is understood that the storage unit 206 can be a distribution of storage elements. Also for illustrative purposes, the storage unit 206 is shown as a single hierarchy storage system, although it is understood that the storage unit 206 can be in a different configuration. For example, the storage unit 206 can be formed with different storage technologies forming a memory hierarchal system including different levels of caching, main memory, rotating media, or off-line storage. The storage unit 206 can be a volatile memory, a nonvolatile memory, an internal memory, an external memory, or a combination thereof. For example, the storage unit 206 can be a nonvolatile storage such as nonvolatile random access memory (NVRAM), Flash memory, disk storage, or a volatile storage such as static random access memory (SRAM) or dynamic random access memory (DRAM).

The storage unit 206 can include a storage interface 208. The storage interface 208 can be used for communication between the storage unit 206 and other functional units or devices of the system 100. The storage interface 208 can also be used for communication that is external to the system 100. The storage interface 208 can receive information from the other functional units or devices of the system 100 or from remote devices 220, or can transmit information to the other functional units or devices of the system 100 or to remote devices 220. The storage interface 208 can include different implementations depending on which functional units or devices of the system 100 or remote devices 220 are being interfaced with the storage unit 206. The storage interface 208 can be implemented with technologies and techniques similar to the implementation of the control interface 204.

The communication unit 216 can enable communication to devices of the system 100 or to remote devices 220. For example, the communication unit 216 can permit the first device 102 to communicate with the second device 106, or can permit the nodes 108 to communicate with one another, or to the first device 102. The communication unit 216 can further permit the devices of the system 100 to communicate with remote devices 220 such as an attachment, such as a peripheral device, through the communication path 104. The communication unit 216 can also function as a communication hub allowing the first device 102, the second device 106, the nodes 108, or a combination thereof to function as part of the communication path 104 and not be limited to be an end point or terminal unit to the communication path 104. The communication unit 216 can include active and passive components, such as microelectronics or an antenna, for interaction with the communication path 104.

The communication unit 216 can include a communication interface 218. The communication interface 218 can be used for communication between the communication unit 216 and other functional units or devices of the system 100 or to remote devices 220. The communication interface 218 can receive information from the other functional units or devices of the system 100, or from remote devices 220, or can transmit information to the other functional units or devices of the system 100 or to remote devices 220. The communication interface 218 can include different implementations depending on which functional units or devices are being interfaced with the communication unit 216. The communication interface 218 can be implemented with technologies and techniques similar to the implementation of the control interface 204.

The user interface 212 can present information generated by the system 100. In one embodiment, the user interface 212 allows a user of the system 100 to interface with the devices of the system 100 or remote devices 220. The user interface 212 can include an input device and an output device. Examples of the input device of the user interface 212 can include a keypad, buttons, switches, touchpads, soft-keys, a keyboard, a mouse, or any combination thereof to provide data and communication inputs. Examples of the output device can include a display interface 214. The control unit 202 can operate the user interface 212 to present information generated by the system 100. The control unit 202 can also execute the software 210 to present information generated by the system 100, or to control other functional units of the system 100. The display interface 214 can be any graphical user interface such as a display, a projector, a video screen, or any combination thereof.

The components 200 can be optimized for implementing an embodiment in a multiple device embodiment wherein the first device 102, the second device 106, the nodes 108, or a combination thereof are required to implement the one or more functions of the system 100. For example, if the first device 102 and the second device 106 are to each provide some functionality of the system 100, the control unit 202 of either the first device 102 or the second device 106 can execute the software 210 of the first device 102, the second device 106, or a combination thereof to implement the functionality of the system 100.

For illustrative purposes, the system 100 is described by operation of the first device 102, the second device 106, or the nodes 108. It is understood that the first device 102, the second device 106, or the nodes 108 can operate any of the modules, units, and functions of the system 100.

Figure 3:
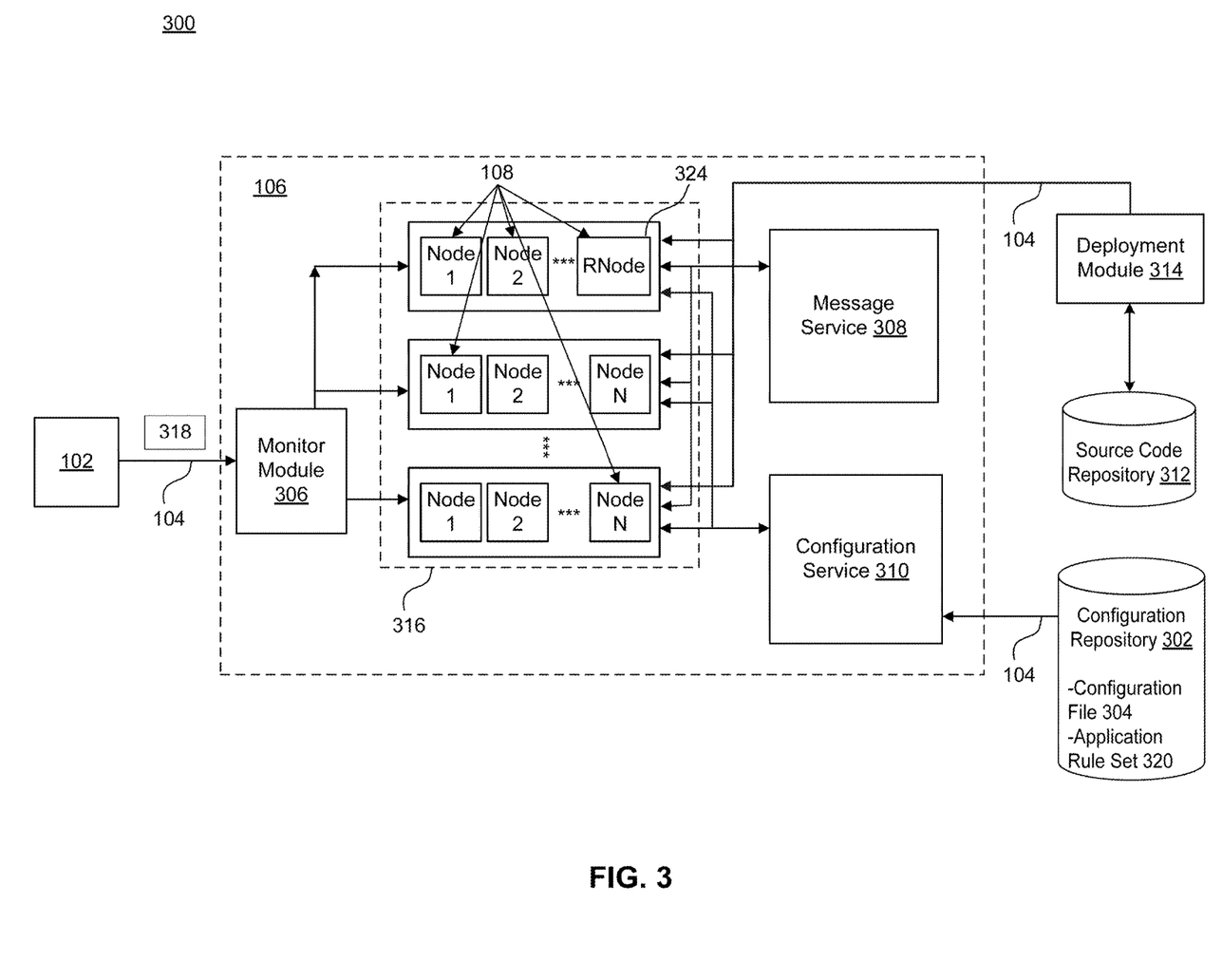
FIG. 3 is an example control flow of the system according to embodiments.

Referring now to FIG. 3, therein is shown an example control flow 300 of the system 100 according to embodiments. For brevity of description, the control flow 300 in FIG. 3 will be described as functioning on the second device 106, in an embodiment where the second device 106 is implemented to include one or more nodes 108. This, however, is merely exemplary. In another embodiment, the control flow 300, or some of its functions can be implemented on the first device 102.

In one embodiment, the control flow 300 can be implemented with modules, sub-modules, or services. In one embodiment, the control flow 300 can include a monitor module 306, a message service 308, and a configuration service 310. In one embodiment, the monitor module 306 can couple to the message service 308 via a network 316, where the network 316 includes the one or more nodes 108. The message service 308 can further couple to the configuration service 310 via the network 316.

The monitor module 306 can enable the receipt of a request 318 from a device, for example the first device 102. In one embodiment, the monitor module 306 can function by implementing a pull model. The pull model refers to a mechanism or process by which the monitor module 306 continuously checks for the request 318 from devices of the system 100, for example the first device 102, to determine whether any of the devices of the system 100 are requesting an update of the application rule set 320. In one embodiment, the pull model can function by sending pull requests at specified times to one or more devices of the system 100 to determine whether the devices of the system 100 are requesting an update to the application rule set 320. The pull requests can be in the form of a signal, data structure, data packet, or a combination thereof. For example, in one embodiment, the monitor module 306 can send pull requests every "X" minutes, where X is an integer, to the devices of the system. In one embodiment, the monitor module 306 can further function by receiving the request 318 from the devices of the system 100 without sending pull requests but rather obtaining the request 318 by the devices of the system 100 when a user of the system 100 makes the request 318 in real-time. Real-time refers to the actual time during which the user of the system 100 makes the request 318.

In one embodiment, the request 318 can trigger or cause the update and configuration of an application rule set 320 of the second device 106 or the nodes 108 or a subset thereof. The request 318 can be in the form of a signal, variable, data, a data structure, an instruction, or a combination thereof. In one embodiment, the request 318 can be sent from the first device 102 to the second device 106. For example, in one embodiment, the request 318 can be part of the data input by a user of the first device 102 using a webpage, web form, or a combination thereof. In another embodiment, the request 318 can be part of the data or instructions within a computer file, such as a text file or a comma separated value file. In another embodiment, the request 318 can be a variable or data structure passed by a computer program and transmitted from the first device 102 to the second device 106 via the communication path 104.

The application rule set 320 refers to a set of guidelines or logic that define or constrain the operation of the second device 106 or nodes 108. The application rule set 320 can be, for example, computer implemented guidelines or rules that can be implemented as a part of a rule management system (RMS), and can include policies, requirements, and conditional statements that are implemented to determine actions to be taken by the second device 106 or the nodes 108. In one embodiment, the application rule set 320 can be implemented as a set of computer rules in a computer file, a computer program, a computer program function, a computer program class, a computer program object, or a combination thereof on the second device 106 or the nodes 108.

By way of example to show the operation of the application rule set 320, in one embodiment, the second device 106 or the nodes 108 or a subset thereof can form part of the backend server infrastructure of an entity, for example a corporation or an institution. The second device 106 or the nodes 108 can together or individually perform a specified function or specified functions. For example, in the case where the entity is a corporation that, for example as a part of its operations, performs advertising campaigns in which products and services are advertised to customers, potential customers, or other external users, the functions of the second device 106 or the nodes 108 or a subset thereof can be to execute the advertising campaigns, wherein the second device 106 or the nodes 108 or a subset thereof can distribute information, in the form of email communications, text messages, push notifications, or similar communications regarding products or services to customers, potential customers, or external users.

In the aforementioned example, the application rule set 320 can provide the rules, guidelines, or policies regarding the method of communication to the customers, potential customers, or external users. For example, the application rule set 320 can determine the rules, guidelines, or policies regarding which customers, potential customers, or external users the second device 106 or the nodes 108 or a subset thereof should contact and under what conditions. For example, if a customer would like to be contacted regarding one service or product but not another service or product, the application rule set 320 can provide the rules, guidelines, or policies that can be implemented by the second device 106 or the nodes 108 or a subset thereof to fulfill the conditions for contacting the customer, potential customer, or external user. In another example, if the customer would like to be contacted at a particular frequency, for example, once a day, once a week, or once a month, then the application rule set 320 can provide the rules, guidelines, or policies that can be implemented by the second device 106 or the nodes 108 or a subset thereof to fulfill the frequency at which the customer is contacted. The aforementioned functions of the application rule set 320 are merely exemplary and not meant to be limiting. The example is meant to demonstrate an example implementation of the application rule set 320 and the types of rules the application rule set 320 can implement. The application rule set 320 can be used to perform other functions in different implementations.

In one embodiment, the application rule set 320 can be stored on, and executed by, the second device 106 or the nodes 108 or a subset thereof to implement the rules, guidelines, or policies of the RMS. In one embodiment, the application rule set 320 can have different versions. In one embodiment, depending on what device the application rule set 320 is stored on, different versions of the application rule set 320 can exist. For example, in one embodiment, one version of the application rule set 320 can be stored on one of the nodes 108 of the one or more nodes 108, while another version of the application rule set 320 can be stored on another node of the one or more nodes 108.

In one embodiment one version of the application rule set 320 can be stored on and retrieved from, a configuration repository 302. The configuration repository 302 refers to a database or storage that can store a version of the application rule set 320 and distribute the version of the application rule set 320 to other devices. In one embodiment, the configuration repository 302 can be implemented using the same technologies and same techniques as the storage unit 206. The configuration repository 302 can be part of second device 106 or be external to the second device 106.

In one embodiment, the configuration repository 302 can transmit the version of the application rule set 320 stored thereon to one or more devices of the system 100. For example, in the embodiment shown in this FIG. 3, the application rule set 320 is shown to be transmitted by the configuration repository 302 to the second device 106. In one embodiment, the application rule set 320 can specifically be transmitted to the configuration service 310 of the second device 106. The configuration service 310 refers to a storage and distribution service of the second device 106 that can store and distribute the application rule set 320 received from the configuration repository 320 for further distribution to devices of the system 100.

In one embodiment, the configuration service 310 can distribute the application rule set 320 to the nodes 108 upon the occurrence of an event or alert requesting or demanding the distribution of the application rule set 320. For example, the event or alert can be in the form of a notification generated by the second device 106 or the nodes 108 or a subset thereof indicating that the request 318 sent from the first device 102 was received by the second device 106 or one or more nodes 108, or that the request 318 was received by a service of the second device 106, such as the message service 308 and stored in a database. In another embodiment, the event or alert can be in the form of a periodic timing criteria such as a real-time, hourly, weekly, daily, etc.

signal generated by the second device 106 or the nodes 108 or a subset thereof at which time the application rule set 320 is requested from the configuration repository 302 by the configuration service 310. For example, the specified periodic timing criteria can be to send a signal requesting the application rule set 320 every hour, once a week, once a day, etc. In another embodiment, the application rule set 320 can be transmitted in an ad hoc manner from the configuration repository 302 based on a trigger condition by one of the devices of the system 100 or by a third party, such as by a system administrator of the system 100. For example, in one embodiment, the application rule set 320 can be transmitted based on a system administrator requesting or demanding that the application rule set 320 be transmitted.

In one embodiment, the configuration service 310 can implement a push model to distribute the application rule set 320 to the devices of the system 100. The push model refers to a mechanism or process by which the configuration service 310, upon receipt of an application rule set 320 from the configuration repository 302 sends a signal, data structure, or a combination thereof to a module of the system 100, for example the monitor module 306 indicating that an application rule set 320 has been received and is ready to be installed on the devices of the system 100. In one embodiment, the push model can function by sending the signal, data structure, or a combination thereof in real-time to the modules of the system 100 upon the receipt of the application rule set 320 from the configuration repository 302. In another embodiment, the push module can function by sending the signal, data structure or a combination thereof at a specified time or as part of a batch process to the modules of the system 100. The sending of the signal, data structure, or a combination thereof by the configuration service 310 can trigger or cause the update and configuration of an application rule set 320 of the second device 106 or the nodes 108 or a subset thereof.

In one embodiment, the application rule set 320 can be transmitted using a configuration file 304. The configuration file 304 refers to a computer file or computer program that can be used to transmit the application rule set 320. The configuration file 304 can be in the form of a text file, an executable file, an object file, a data file, a hyperlink, or a combination thereof. For example, if the configuration file 304 is in the form of a text file, the application rule set 320 can be sent as a set of rules or conditional statements embedded in the text file. If, however, the configuration file 304 is an executable file or an object file, the application rule set 320 can be sent as a set of rules or functions containing the rules as conditional statements to be executed once the executable file or the object file is executed by a processor, an operating system, or a combination thereof.

Continuing with the example of the control flow 300, and assuming the embodiment where a pull model is implemented and from when the monitor module 306 receives the request 318 from the first device 102, in one embodiment, the monitor module 306, upon receipt of the request 318 can further enable the transmission of the request 318 to a receiver node 324 chosen from the nodes 108 to further receive the request 318. The receiver node 324 refers to a node from amongst the one or more nodes 108 that can receive the request 318 from the monitor module 306 and can further transmit the request 318 to the message service 308 for storage on a database associated with, or that can be accessed by, the message service 308. The receiver node 324 can act as a gateway or bridge between the monitor module 306, the nodes 108, and the services of the second device 106, such as the message service 308 and the configuration service 310.

In one embodiment, the monitor module 306 can determine which node from amongst the one or more nodes 108 will be the receiver node 324. In one embodiment, the receiver node 324 can be selected based on a selection criteria. In one embodiment, the selection criteria can be, for example, based on a network traffic to and from the nodes 108. For example, in one embodiment, the monitor module 306 can analyze a network traffic to and from the nodes 108 and determine which node from among the one or more nodes 108 has the least amount of network traffic going to and from the node, in terms of bits or bytes of data going to and from the node over a period of time, and select the node with the least amount of network traffic as the receiver node 324. For example, if the network traffic is below a threshold value, for example below "X" number of bits or bytes to the node per second, where "X" is an integer, the monitor module 306 can select a node falling below the threshold value as the receiver node 324. In another embodiment, the selection criteria can further be, for example, based on analyzing a processor speed, processor bandwidth, a node storage capacity, or a combination thereof amongst the nodes 108. For example, in one embodiment, the monitor module 306 can select the receiver node 324 as the node from amongst the nodes 108 that has the fastest processing speed, the most bandwidth to process data, the most storage capacity, or a combination thereof.

In one embodiment, once the monitor module 306 selects the receiver node 324 and transmits the request 318 to the receiver node 324, the receiver node 324 can further transmit or route the request 318 to the message service 308. The message service 308 refers to a service of the second device 106 that acts as a message repository for messages to and from different devices, functional units, or services of the system 100. The messages can be in the form of, for example, commands, instructions, files, communications, configurations, or a combination thereof between devices, functional units, or services to be distributed between the nodes 108, the functional units of the second device 106, or services of the second device 106, or a combination thereof.

In one embodiment, once the receiver node 324 receives and transmits the request 318 to the message service 308, the message service 308 can store the request 318 in a database. The database can be implemented with similar technologies and techniques as the storage unit 206. In one embodiment, once the request 318 is stored in the database, the message service 308 can generate a notification to other functional units of the second device 106, the nodes 108, or a combination thereof indicating that the request 318 has been made by the first device 102 to update and configure the application data set 320 of the nodes 108 or a subset thereof.

In one embodiment, based on the notification, the nodes 108 or a subset thereof can generate an access request to access the configuration service 310 so the nodes 108 or a subset thereof can access the configuration file 304 containing the application rule set 320 stored on the configuration service 310. The access request can be in the form of a signal, variable, data, a data structure, an instruction, or a combination thereof. In one embodiment, once the access request is received by the configuration service 310, the configuration service 310 can distribute the configuration file 304 to the nodes 108 or a subset thereof that made the access request by transmitting the configuration file 304, including the application rule set 320 contained in the configuration file 304, to the nodes 108 or a subset thereof.

In one embodiment, the nodes 108 or a subset thereof that made the access request can receive the configuration file 304 including the application rule set 320, and based on the application rule set 320 received, can update and configure the previous version of the application rule set 320 with the updated application rule set 320 received from the configuration service 310, by for example replacing and storing the updated version of the configuration file 304 in their storage and using the same to update their rules, policies, or guidelines for implementing functions for the RMS. In one embodiment, if the configuration file 304 is an executable file or object file, the nodes 108 or a subset thereof can update and configure their rules, policies, or guidelines by executing the configuration file 304 to implement the application rule set 320. In one embodiment, if the configuration file 304 is a text file, the nodes 108 or a subset thereof can store the text file, access the text file, and parse the text file to access the rules, policies, or guidelines when implementing the functions of the RMS.

By way of example, referring back to the example and embodiment where the nodes 108 are part of a system for executing advertising campaigns, and each node amongst the one or more nodes 108 is responsible for communicating with a set of customers, potential customers, or external users in a particular manner to implement the advertising campaign, the application rule set 320 for each of the nodes 108 or a subset thereof can be updated and changed, or modified such that the rules, policies, or guidelines for each node to communicate with a customer, a potential customer, or an external user can be varied. For example, if one node, for example "NODE A" previously could only communicate with an external user who was within a certain geographic region, for example "REGION A," and only via "EMAIL," the application rule set 320 of the node can be updated, modified, or changed such that the NODE A can now contact external users from REGION A and a new geographic region, for example "REGION B," and in addition to communicating via EMAIL can communicate using the additional communication platform of "TEXT MESSAGE." As a result, the application rule set 320 can control a method of communication by the nodes 108 to the customers, potential customers, or external users. In one embodiment, the application rule set 320 of each node from amongst the one or more nodes 108 can vary such that the rules, policies, and guidelines for the node can be different from those of the other nodes 108. The aforementioned is merely an example of a way in which the application rule set 320 can be updated and configured for each of the nodes 108 or a subset thereof and is not meant to be limiting. Other rules, policies, and guidelines can be updated in a similar manner as described above.

In one embodiment, the nodes 108 can run the software 210 to provide part of their intelligence. In one embodiment, the software 210 can be stored in a source code repository 312 and can be transmitted and received by the nodes 108 via a download process. The source code repository 312 refers to a storage that can store and deploy the software 210 for the nodes 108. In one embodiment, the source code repository 312 can be implemented using similar technologies and techniques as the storage unit 206. Continuing with the example, to facilitate the download process a deployment module 314 can be used. The deployment module 314 can interface between the source code repository 312 and the nodes 108 to facilitate the download of the software 210 from the source code repository 312 to the nodes 108. In one embodiment, the deployment module 314 can, for example, provide the protocol functions and the APIs necessary to facilitate the download of the software 210 from the source code repository 312 to the nodes 108. A feature of the disclosure is that the updating and configuration of the application rule set 320 is independent from the download process of the software 210 for the nodes 108. This separation provides the system 100 the ability to isolate the rules, policies, and guidelines that the nodes 108 are to implement from the underlying functions that provide the operational functionality of the nodes 108. As a result, the software 210 which makes the nodes 108 operate is separated from the rules, policies, and guidelines implemented by the nodes 108 implementing the RMS.

The methods, modules, units, and components implementing the above-described system 100 significantly improve the ability of the system 100 to implement rules, policies, and guidelines of a cloud-based RMS. Specifically, it has been discovered that by implementing the system 100 as described above, the system 100 can provide an efficient cloud computing platform that can be used to modularize and isolate the impact of updates to devices of the system 100. For example, updates to the one or more nodes 108 can be isolated from one another based on the system 100 having the ability to update and configure the application rule set 320 of one node without impacting the operation of the other nodes 108.

The system 100 as described above can be used to implement multiple functionalities on the nodes 108 of the system 100 without the need to upgrade or update every node of the system 100 and, as a result, minimizes the impact of different devices of the cloud-based RMS on one another. The system 100 described above also improves the efficiency of a cloud computing RMS based on the ability to upgrade certain devices of the RMS without causing downtime to other devices of the cloud-based RMS.

Additionally, the system 100 significantly improves the ability to control each device of the system 100 because each device can be upgraded and configured individually, thus resulting in better fine-tuning of the system 100. The system 100 as described above can also provide greater redundancy and stability because, if one of the nodes 108 fails, another node can be updated with an application rule set 320 providing similar functionality as the failed node. In this way, no interruption of services will be incurred by an entity implementing a RMS using the above-disclosed system 100.

The system 100 has been described with module or service functions or order as an example. The system 100 can partition the modules or services differently or order the modules or services differently. For example, the software 210 can include the modules or services for the system 100. As a specific example, the software 210 can include the monitor module 306, the message service 308, the configuration service 310, the deployment module 314, and associated sub-modules included therein.

The control unit 202 can execute the software 210 to operate the modules or services. For example, the control unit 202 can execute the software 210 to implement the monitor module 306, the message service 308, the configuration service 310, the deployment module 314, and associated sub-modules included therein.

The modules described in this application can be implemented as instructions stored on a non-transitory computer readable medium to be executed by the control unit 202. The non-transitory computer readable medium can include the storage unit 206. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the system 100 or installed as a removable portion of the system 100.

Figure 4:
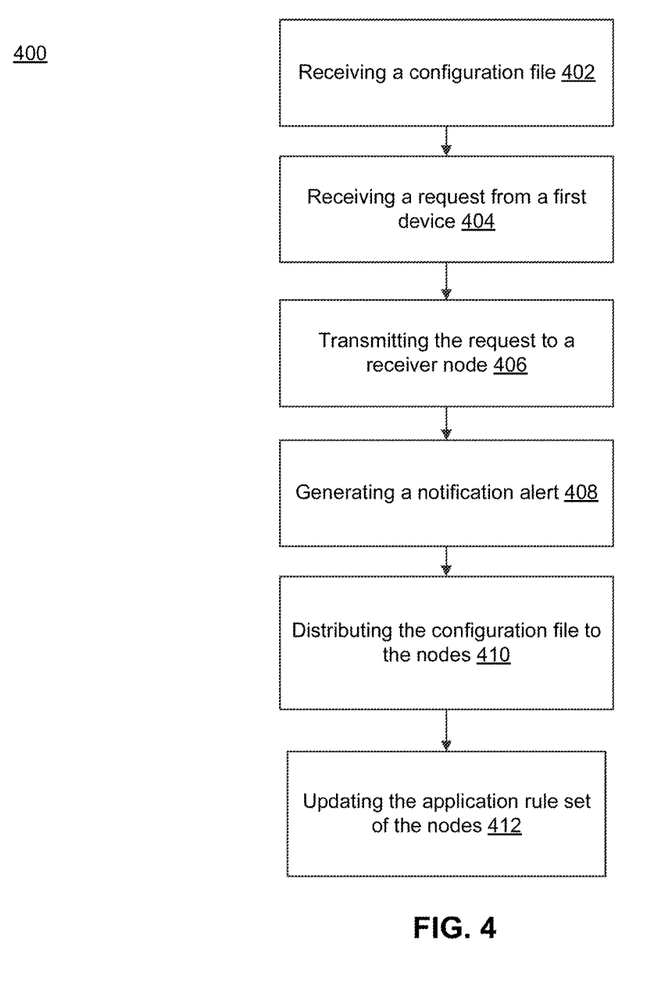
FIG. 4 is an example method of operating the system according to embodiments.

Referring now to FIG. 4, therein is shown an example method 400 of operating the system according to embodiments.

In step 402, a configuration file (such as configuration file 304, discussed above) is received from a configuration repository. The configuration file contains instructions for configuring an application rule set (such as application rule set 320) of one or more nodes (such as nodes 108) in a network. For example, the configuration file can be received by the communication unit (such as communication unit 216) of the second device (such as second device 106) via the communication path (such as communication path 104).

In step 404, a request (such as request 318) is received from a first device (such as first device 102) to configure the application rule set of the one or more nodes based on the configuration file. For example, the request from the first device can be received by the communication unit of the second device via the communication path.

In step 406, the request is transmitted to a receiver node (such as receiver node 324) selected from the one or more nodes. The receiver node then further transmits the request to a message service (such as message service 308) for storage on a database. For example, the request can be transmitted by the communication unit of the receiver node via the communication path.

In step 408, a notification can be generated. In an embodiment, the notification alerts the one or more nodes that the request is stored on the database. For example, the notification can be generated by a control unit (such as control unit 202) of the second device or the receiver node, in conjunction with the message service.

In step 410, the configuration file is distributed to a subset of the one or more nodes based on receipt of an access request from the one or more nodes in response to the notification. In an embodiment, the access request requests access to the configuration file. For example, the distribution can be performed by the control unit of the second device or the receiver node, in conjunction with a configuration service (such as configuration service 310).

In step 412, the application rule set of the subset of the one or more nodes is updated based on the configuration file. For example, the updating can be performed by the control unit of the second device or the nodes by updating a software (such as software 210) of the nodes with the application rule set found in the configuration file.

The above detailed description and embodiments of the disclosed system 100 are not intended to be exhaustive or to limit the disclosed system 100 to the precise form disclosed above. While specific examples for the system 100 are described above for illustrative purposes, various equivalent modifications are possible within the scope of the disclosed system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown or described as being performed in series, these processes or blocks may instead be performed or implemented in parallel, or may be performed at different times.

The resulting method, process, apparatus, device, product, and system is cost-effective, highly versatile, and accurate, and can be implemented by adapting components for ready, efficient, and economical manufacturing, application, and utilization. Another aspect of an embodiment is that it valuably supports and services the historical trend of reducing costs, simplifying systems, and increasing performance.

These and other valuable aspects of the embodiments consequently further the state of the technology to at least the next level. While the disclosed embodiments have been described as the best mode of implementing the system 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operating a cloud computing system comprising:
   receiving, by one or more computing devices, a configuration file from a configuration repository, wherein the configuration file contains instructions for configuring an application rule set of one or more nodes in a network;
   monitoring, by the one or more computing devices and by continuously checking a plurality of devices, the plurality of devices for a request from at least one of the plurality of devices, wherein the request indicates the at least one of the plurality of devices is requesting to configure the application rule set of the one or more nodes based on the configuration file;
   transmitting, by the one or more computing devices, the request to a receiver node selected from the one or more nodes, wherein the receiver node further transmits the request to a message service for storage on a database;
   generating, by the one or more computing devices, a notification, wherein the notification alerts the one or more nodes that the request is stored on the database;
   distributing, by the one or more computing devices, the configuration file to a subset of the one or more nodes based on receipt of an access request from the one or more nodes in response to the notification, wherein the access request requests access to the configuration file; and
   updating, by the one or more computing devices, the application rule set of the subset of the one or more nodes based on the configuration file.

2. The method of claim 1, wherein the monitoring further comprises sending one or more pull requests at specified times to the plurality of devices to check for the request.

3. The method of claim 1, wherein the request is stored on the at least one of the plurality of devices.

4. The method of claim 1, further comprising:
   selecting, by the one or more computing devices, the receiver node from the one or more nodes based on analyzing one of a processor speed, a processor bandwidth, or a node storage capacity of the one or more nodes, and
   wherein the selecting is based on:
      the receiver node having the fastest processing speed amongst the one or more nodes, the receiver node having the most processor bandwidth amongst the one or more nodes, or the receiver node having the most node storage capacity amongst the one or more nodes.

5. The method of claim 1, wherein the configuration file configures the application rule set to control a method of communication by the one or more nodes to one or more external users, wherein the method of communication comprises: an email communication, a text message, or a push notification.

6. The method of claim 1, wherein distributing the configuration file to the subset of the one or more nodes includes distributing the configuration file to all of the one or more nodes in the subset of the one or more nodes.

7. The method of claim 1, wherein updating the application rule set of the subset of the one or more nodes based on the configuration file includes updating the application rule set of all of the subset of the one or more nodes.

8. A non-transitory computer readable medium having instructions stored thereon that, when executed by a cloud computing system, cause the cloud computing system to perform operations comprising:

receiving a configuration file from a configuration repository, wherein the configuration file contains instructions for configuring an application rule set of one or more nodes in a network;

monitoring, by continuously checking a plurality of devices, the plurality of devices for a request from at least one of the plurality of devices, wherein the request indicates the at least one of the plurality of devices is requesting to configure the application rule set of the one or more nodes based on the configuration file;

transmitting the request to a receiver node selected from the one or more nodes, wherein the receiver node further transmits the request to a message service for storage on a database;

generating a notification, wherein the notification alerts the one or more nodes that the request is stored on the database;

distributing the configuration file to a subset of the one or more nodes based on receipt of an access request from the one or more nodes in response to the notification, wherein the access request requests access to the configuration file; and updating the application rule set of the subset of the one or more nodes based on the configuration file.

9. The non-transitory computer readable medium of claim 8, the operations further comprising monitoring by sending one or more pull requests at specified times to the plurality of devices to check for the request.

10. The non-transitory computer readable medium of claim 8, wherein the request is stored on the at least one of the plurality of devices.

11. The non-transitory computer readable medium of claim 8, the operations further comprising:

selecting, by the one or more computing devices, the receiver node from the one or more nodes based on analyzing one of a processor speed, a processor bandwidth, or a node storage capacity of the one or more nodes, and wherein the selecting is based on:
the receiver node having the fastest processing speed amongst the one or more nodes,
the receiver node having the most processor bandwidth amongst the one or more nodes, or
the receiver node having the most node storage capacity amongst the one or more nodes.

12. The non-transitory computer readable medium of claim 8, wherein the configuration file configures the application rule set to control a method of communication by the one or more nodes to one or more external users, wherein the method of communication comprises: an email communication, a text message, or a push notification.

13. The non-transitory computer readable medium of claim 8, wherein distributing the configuration file to the subset of the one or more nodes includes distributing the configuration file to all of the one or more nodes in the subset of the one or more nodes.

14. The non-transitory computer readable medium of claim 8, wherein updating the application rule set of the subset of the one or more nodes based on the configuration file includes updating the application rule set of all of the subset of the one or more nodes.

15. A cloud computing system comprising:

a communication unit configured to:
receive a configuration file from a configuration repository, wherein the configuration file contains instructions for configuring an application rule set of one or more nodes in a network;
transmit a request to a receiver node selected from the one or more nodes, wherein the receiver node further transmits the request to a message service for storage on a database; and a control unit, coupled to the communication unit, configured to:
monitor, by continuously checking a plurality of devices, the plurality of devices for the request from at least one of the plurality of devices, wherein the request indicates the at least one of the plurality of devices is requesting to configure the application rule set of the one or more nodes based on the configuration file;
generate a notification, wherein the notification alerts the one or more nodes that the request is stored on the database;
distribute the configuration file to a subset of the one or more nodes based on receipt of an access request from the one or more nodes in response to the notification, wherein the access request requests access to the configuration file; and
update the application rule set of the subset of the one or more nodes based on the configuration file.

16. The cloud computing system of claim 15, wherein the control unit is further configured to monitor by send one or more pull requests at specified times to the plurality of devices to check for the request.

17. The cloud computing system of claim 15, wherein the request is stored on the at least one of the plurality of devices.

18. The cloud computing system of claim 15, wherein the configuration file configures the application rule set to control a method of communication by the one or more nodes to one or more external users, wherein the method of communication comprises: an email communication, a text message, or a push notification.

19. The cloud computing system of claim 15, wherein the control unit is further configured distribute the configuration file to the subset of the one or more nodes by distributing the configuration file to all of the one or more nodes in the subset of the one or more nodes.

20. The cloud computing system of claim 15, wherein the control unit is further configured to update the application rule set of the subset of the one or more nodes based on the configuration file by updating the application rule set of all of the subset of the one or more nodes.

\* \* \* \* \*